United States Patent [19]

Aoyama et al.

[11] Patent Number: 4,876,062

[45] Date of Patent: Oct. 24, 1989

[54] FUEL ASSEMBLY

[75] Inventors: Motoo Aoyama, Hitachi; Yasunori Bessho, Mito; Sadao Uchikawa, Katsuta; Renzo Takeda, Kawasaki; Yoshihiko Ishii, Hitachi, all of Japan

[73] Assignee: Hitachi, Ltd., Tokyo, Japan

[21] Appl. No.: 172,418

[22] Filed: Mar. 24, 1988

[30] Foreign Application Priority Data

Mar. 25, 1987 [JP] Japan .................... 62-68873

[51] Int. Cl.$^4$ ............................... G21C 3/32
[52] U.S. Cl. ..................... 376/444; 376/443; 376/447
[58] Field of Search ............. 376/443, 444, 447

[56] References Cited

U.S. PATENT DOCUMENTS

| | | | |
|---|---|---|---|
| 4,587,089 | 5/1986 | Takeda | 376/428 |
| 4,597,937 | 7/1986 | Sakurai | 376/441 |
| 4,652,426 | 3/1987 | Boyle | 376/352 |
| 4,683,113 | 7/1987 | Mochida | 376/419 |
| 4,686,079 | 8/1987 | Ishikawa | 376/444 |
| 4,755,348 | 7/1988 | Shiralkar | 376/282 |
| 4,759,912 | 7/1988 | Talejarkhan | 376/435 |
| 4,762,669 | 8/1988 | Doshi | 376/442 |
| 4,777,016 | 10/1988 | Yoshioka | 376/444 |
| 4,789,520 | 12/1988 | Morimoto | 376/419 |

Primary Examiner—Donald P. Walsh
Attorney, Agent, or Firm—Antonelli, Terry & Wands

[57] ABSTRACT

A fuel assembly of the present invention comprises a plurality of fuel rods which are held by an upper tie plate and lower tie plate at the ends thereof and a moderating rod which is arranged between the fuel rods and held by the lower tie plate at its lower end. The fuel rods are arranged in a lattice form having 9 rows and 9 columns, and the moderating rod contains a passage for a coolant and has a cruciate cross-sectional form. The ratio $A_M/A_C$ of the area $A_M$ of a moderator region in the moderating rod in the cross-sectional plane in which the moderator is present to the area $A_C$ of the coolant passages in said fuel assembly is within the range of 0.07 to 0.11, and the area $A_M$ is 75% or more of the total area of the fuel lattice units in which none of the fuel rods is arranged, but the moderating rod is arranged.

11 Claims, 18 Drawing Sheets

| J 1.39 | J 1.17 | J 1.09 | J 1.06 | J 1.05 |
|---|---|---|---|---|
| J 1.17 | 0.97 | 0.91 | 0.89 | 0.88 |
| J 1.09 | 0.91 | 0.86 | 0.87 | 0.89 |
| J 1.06 | 0.89 | 0.87 | K 0.99 | |
| J 1.05 | 0.88 | 0.89 | | |

FIG. 17
FIG. 18
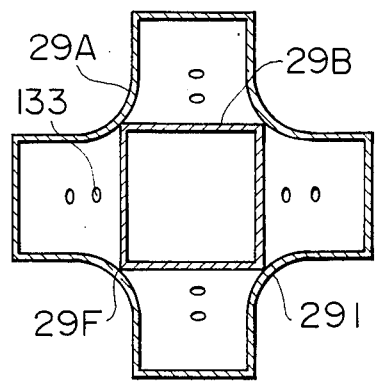
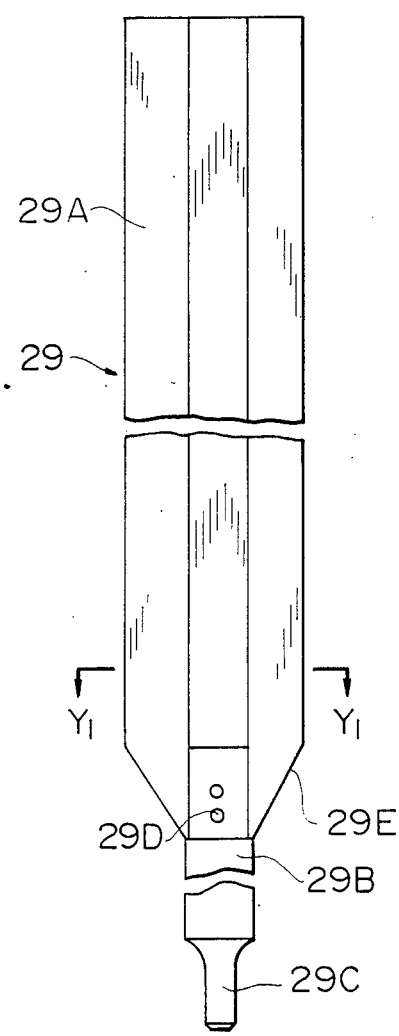

FUEL ASSEMBLY

BACKGROUND OF THE INVENTION

The present invention relates to a fuel assembly, and particularly to a fuel assembly which has a water rod and is suitable for use in a boiling water reactor.

A conventional assembly for installation in a boiling water reactor comprises a channel box having a quadrangular cylindrical form and a fuel bundle which is received in the channel box. This fuel bundle comprises an upper tie plate and lower tie plate which are respectively provided at the upper and lower ends of the channel box, a plurality of spacers which are axially arranged at given distances in the channel box, a plurality of fuel rods which are regularly arranged in a square lattice form and pass through the spacers, and a water rod serving as a neutron moderating rod.

In such a boiling water reactor, the phase change of a coolant takes place in a fuel assembly and serves to remove heat. Therefore, the coolant flowing in the upwardly direction of the fuel assembly has a lower density at its upper position. Gap water, which is a region of saturated water, is present around the circumference of the channel box so that a control rod or a tube equipped with a neutron detector can be inserted therein. In this way, the fuel assembly arrangement is such that coolant is unevenly distributed through the fuel assembly in the horizontal and vertical direction during operation. Light water serving as a coolant acts as a moderator for neutrons, and, in a conventional fuel assembly, the ratio of fuel to moderator, an important factor in determining nuclear properties, depends upon the position of the moderator in the fuel assembly. A water rod which is disposed at the center of the fuel assembly improves the nuclear properties, as well as improving the stability of a reactor core. However, the heterogeneity described above has more influence in the case of a fuel assembly where an attempt is made to increase the average enrichment thereof view to increasing the degree of burn-up, thereby to realize more effective use of uranium resources and a reduction in the powder cost of generating power.

Examples of fuel assemblies which have been proposed to solve the above-described problem include a fuel assembly in which the number of neutron moderating rods is increased, a fuel assembly as disclosed in Japanese Patent Laid-Open No. 65792/1984 in which a large-diameter moderating rod having a diameter that is greater than the side of a fuel lattice unit is disposed, and a fuel assembly as disclosed in Japanese Patent Laid-Open Nos. 40986/1975 and 178387/1984 in which a moderating rod having a square cross section is disposed

SUMMARY OF THE INVENTION

It is an object of the present invention to provide a fuel assembly which allows the degree of thermal allowance to be increased and the fuel economy to be improved.

It is another object of the present invention to make the power distribution in the cross-sectional plane of a fuel assembly even.

The first object of the present invention can be achieved by controlling a ratio $A_M/A_C$ representing the ratio between the area $A_M$ of a moderator region in a moderating rod in a cross-sectional plane in which a moderator is present and the area $A_C$ of a coolant passage in a fuel assembly and the area $A_M$. The ratio $A_M/A_C$ is controlled to take a value within the range of 0.07 to 0.11, and the area $A_M$ is controlled to take a value equivalent to 75% or more of the total area of fuel lattice units in which a moderating rod is arranged, but in which no fuel rods are disposed.

Each fuel lattice unit has a square shape obtained by connecting the axes of four adjacent fuel rods in the fuel rods which are arranged in a lattice form, and represents a region defined by four lines which pass through the intermediate points between a fuel rod and four adjacent fuel rods arranged around it and which are parallel with the lines of arrangement of the fuel rods. A typical example is the S-shaped form shown in FIG. 4 described below.

Since the ratio $A_M/A_C$ of the area $A_M$ of a moderator region to the area $A_C$ of a coolant passage in a fuel assembly is within the range of 0.07 to 0.11, the fuel assembly enables savings to be made in terms of both uranium consumption and fuel economy. In addition, since the area $A_M$ is 75% or more of the total area of a plurality of fuel lattice units in which no fuel rods are arranged, but in which a moderator is arranged, the rate of increase in the critical power and the degree of thermal allowance are increased.

BRIEF DESCRIPTION OF DRAWINGS

FIGS. 17 and 20 are side views of other embodiments of the water rod;

FIG. 18 is a sectional view taken along the line $Y_1$—$Y_1$ of FIG. 17;

DETAILED DESCRIPTION OF THE PREFERRED EMBODIMENTS

The present invention has been achieved on the basis of the results of investigations conducted by the inventors with respect to the characteristics of conventional fuel assemblies.

As a result of these investigations, the inventors have found that an increase in the degree of burn-up of a fuel assembly requires improvements in fuel economy and thermal allowance.

Figure 2:
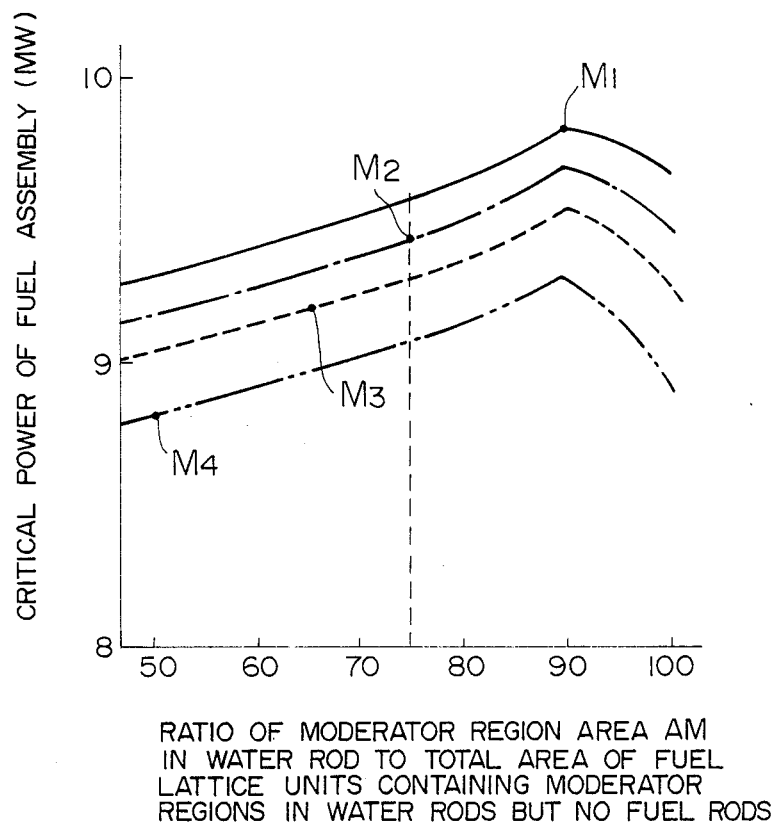
FIG. 2 is a diagram of characteristics showing the relationship between the critical power of a fuel assembly and the ratio of the cross-section of a moderator region in a water rod to the total cross-section of fuel lattice units where no fuel rods are arranged, but a moderator region in a water rod is arranged.

Particular reference is made to the fuel assembly shown in FIG. 2 of Japanese Patent Laid-Open No. 178387/1984 in which moderating rods each having a square sectional form are arranged in the shape of a cross at the center, and a minimal space is formed between a fuel spacer lattice and the moderating rods so that the moderating rods can be easily inserted or extracted. This fuel assembly aims at effective use of fuel by allowing the moderating rods to be inserted or extracted the moderating rods during the operation of a reactor. However, cooling water flowing in the spaces between the adjacent moderating rods contributes to removal of heat from the fuel rods to slight degrees and thus decreases the thermal allowance in the conventional fuel assembly.

As a result of investigations conducted by the inventors with respect to the structure of a fuel assembly capable of solving the above-described problem, the inventors have reached the conclusion that it is desirable for the ration $A_M/A_C$ of the area $A_M$ of a moderator region in a moderating rod in the cross-sectional plane containing a moderator to the area of a coolant passage in a fuel assembly to be kept within the range of 0.07 to 0.11, and for the area $A_M$ to be 75% or more of the total area $A_U$ of fuel lattice units where a moderating rod is disposed, but in which no fuel rods are arranged, as described above.

The range of the ratio $A_M/A_C$ is first described below.

Figure 1:
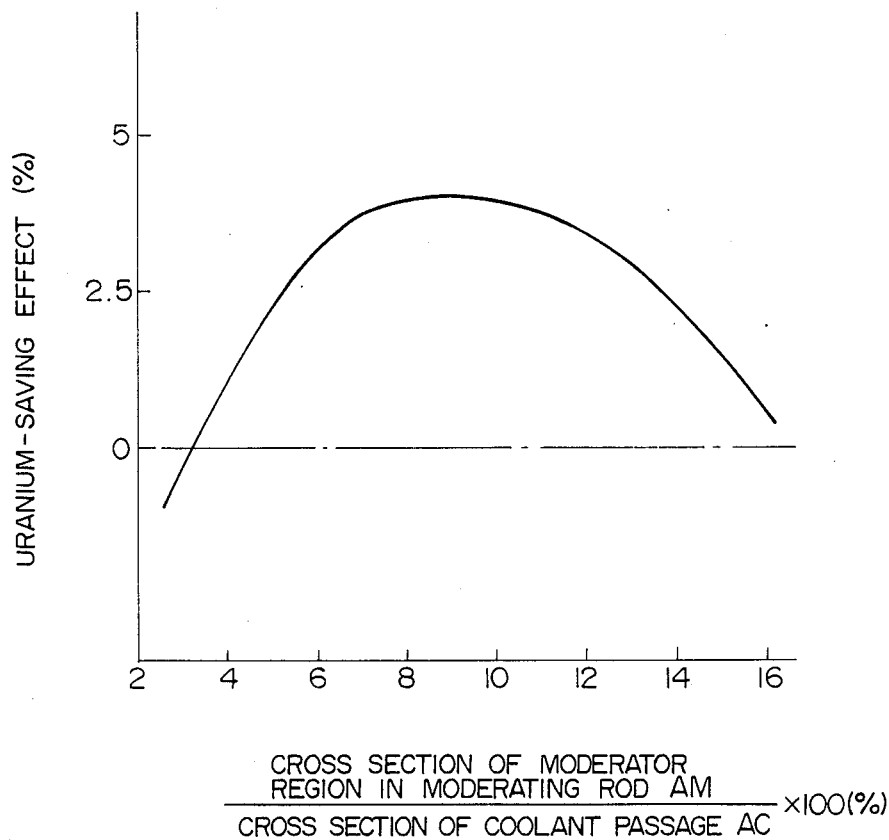
FIG. 1 is a diagram of the characteristics showing the relationship between the saving on the consumption of uranium and the ratio of the cross-section of a moderator region in a moderating rod to the cross section of a coolant passage.

FIG. 1 shows the relationship between the ratio $A_M/A_C$ and the effect of saving uranium. One water rod is used as a moderating rod. The cross-sectional area $A_M$ of a moderator region in the moderating rod is the cross-sectional area of a water region in the water rod. The cross-sectional area $A_C$ of a coolant passage is the area of a coolant passage in the cross-sectional plane of a fuel assembly and contains none of the cross-sectional area of a saturated water region (moderator region) in the water rod. With the ratio $A_M/A_C$ within the range of 0.07 to 0.11, the effect of saving uranium is large, and, with the ratio at 0.09, the effect of saving uranium at its the maximum level. As the moderator region in the moderating rod is increased, the ratio of fuel to the moderator is increased and the effect of slowing down neutrons at the center of a fuel assembly is also increased. Therefore, the non-uniformity in the distribution of thermal neutron fluxes in the fuel assembly is reduced, and the non-uniformity is particularly remarkably remarkably reduced with the ratio $A_M/A_C$ at 0.07 or more. Consequently, neutrons can be effectively employed in nuclear fission reaction, and, as shown in FIG. 1, the effect of saving uranium is increased with the ratio $A_M/A_C$ being 0.07 or more. However, when the area of the moderator region in the moderating rod is increased and the ratio $A_M/A_C$ becomes over 0.11, the above-described effect is greatly reduced. This is because the ratio of moderator to fuel becomes too large and the absorption of neutrons by the moderator is increased, and also because the amounts of fuel materials charged (fertile material and fissionable material) must be reduced in order to secure the area of a coolant passage in the fuel assembly and thus to prevent any increase in the pressure loss.

A description will now be made of the area $A_M$ which is preferably 75% or more of the total area of a plurality of fuel lattice units.

In FIG. 2, the axis of abscissas is the ratio of the area $A_M$ of a saturated water region in the a rod to the total area $A_U$ of fuel lattice units where no fuel rods are arranged but in which a water rod is disposed, and the axis of ordinate is the critical power of a fuel assembly. Such relationships are shown by using the number (5 to 9) of the above-described fuel lattice units as a parameter. If the ratio of the area $A_M$ to the area $A_U$ is 75% or more, the rate of increase in the critical power of the fuel assembly is larger than that in the case of the ratio is below 75%. However, if the ratio of the area $A_M$ to the area $A_U$ is over 90%, the critical power of the fuel assembly starts to decrease. This is because the cross-sectional area (total cross-sectional area of the area $A_M$ and the area of a hollow rod which is a constituent member of the water rod and in which a saturated water region is present) of the water rod containing the hollow rod becomes greater than the area $A_U$, and the space formed between each of the sides of the water rod and the fuel rods adjacent to the water rod is reduced, with the coolant flows near the fuel rods being consequently reduced. It is therefore preferable that the area $A_M$ is 75% or more of the area $A_U$.

In FIG. 2, with the ratio of the area $A_M$ to the area $A_U$ at 90% or more, the critical power of the fuel assembly is at its maximum value. The reasons for this are described below.

(1) In general, if the cross-sectional area of a water rod is changed, the area of a coolant passage and the length of a wetted side change also. Thus, the flow of coolant and the quality distribution vary.

(2) Since, the gap between a water rod nd a fuel rod is sufficiently large if the ratio $A_U/A_M$ is small, boiling transition takes place in, for example, fuel rods in the vicinity of a channel box, in the same way as a case in which no water rod is present.

(3) Since, the area of a cooling water passage around a water rod is reduced if the ratio $A_U/A_M$ is increased cooling water flows relatively easily around a channel box, and the thermal allowance of the fuel rods in the vicinity of the channel box is thus increased. While in the periphery of the fuel rods adjacent to a water rod, the flow of cooling water is reduced, and quality is increased, whereby boiling transition is facilitated.

(4) Therefore, if the cross-sectional area of a water rod is changed, the thermal allowance of a fuel assembly becomes maximal when the thermal allowances of the fuel rods in the vicinity of the water rod and in other portions are the same, because of the above-described changes in these thermal allowances.

In addition, in FIG. 2, $M_1$, $M_2$, $M_3$ and $M_4$ denotes the points at which the ratios $A_M/A_C$ are each at 0.09 in the cases in which the numbers of the fuel lattice units replaced by a water rod are 5, 6, 7 and 9, respectively. When the number of the fuel lattice units is 9, the ratio of the area $A_M$ to the area $A_U$ is extremely decreased to a value of below 75% in order to attain the ratio $A_M/A_C$ at 0.09. In addition, when the number of fuel lattice units is 9, the ratio of the area $A_M$ to the area $A_U$ is below 75% with the ratio $A_M/A_C$ shown in FIG. 1 which is within the range of 0.07 to 0.11. When the number of fuel lattice units is 7, the ratio of the area $A_M$ to the area $A_U$ is below 75% at the point at which $A_M/A_C=0.09$, but there is a region in which the ratio of the area $A_M$ to the area $A_U$ is 75% or more within the range with the ratio $A_M/A_C$ which is within the range of 0.09 to 0.11. Therefore, the number of fuel lattice units replaced by a water rod is preferably 5 to 7.

Figure 3:
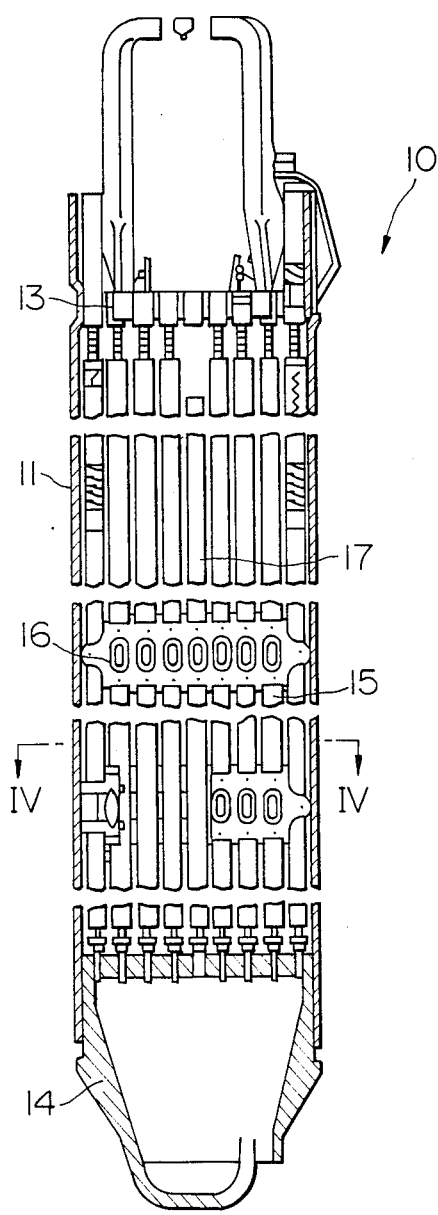
FIG. 3 is a longitudinal sectional view of a fuel assembly of a preferred embodiment of the present invention which is applied to a boiling water reactor.

A preferred embodiment of a fuel assembly of the present invention which is applied to a boiling water reactor is described below with reference to FIGS. 3 and 4.

A fuel assembly 10 comprises an upper tie plate 3, a lower tie plate 14, a plurality of fuel rods 15 which are held by the upper and lower tie plates at their ends, fuel spacers 16 for keeping the width of a gap between the respective fuel rods at a given value, and a water rod 17 which is provided on the lower tie plate 14. A plurality of the fuel spacers 16 are arranged in the axial direction of the fuel assembly 10 and hold the fuel rods 15 and the water rod 17. A channel box 11 is provided on the upper tie plate 13 and surrounds the outside of a bundle of the fuel rods 15 bundled by the fuel spacers 16.

Figure 4:
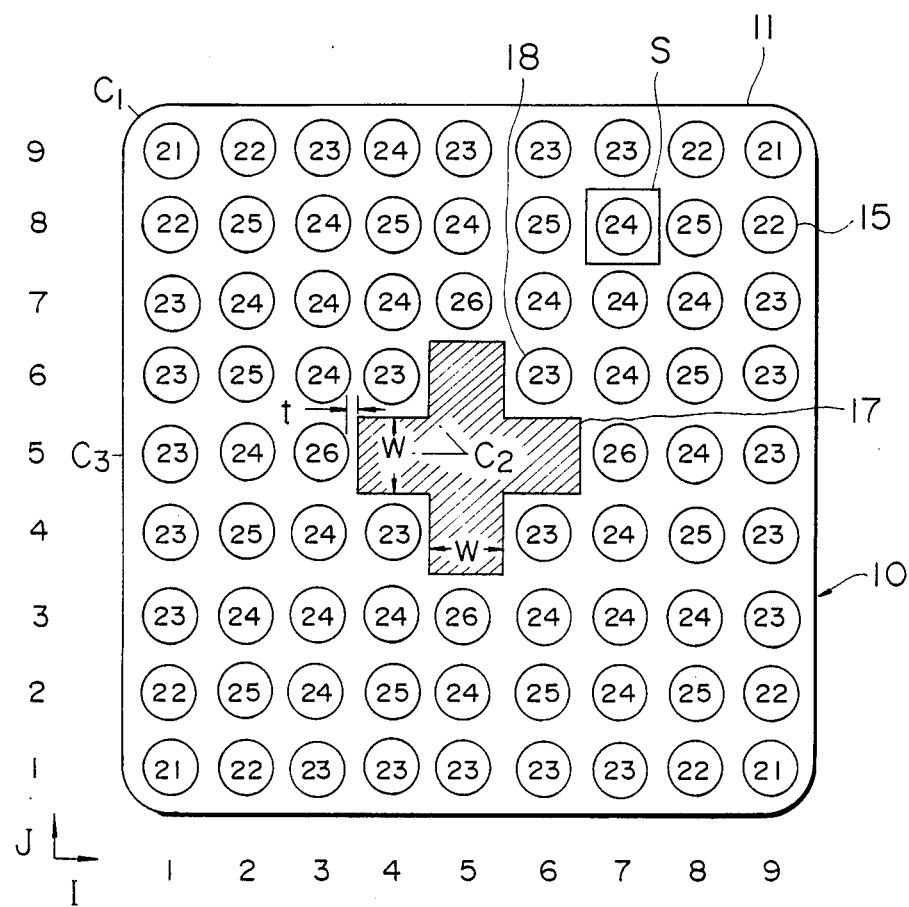
FIG. 4 is a sectional view taken along the line IV—IV of FIG. 3.

The water rod 17 has the cross section of a cruciate form and is placed at the center in the cross-sectional plane of the fuel assembly 10, as shown in FIG. 4. Six kinds of fuel rods 21 to 26 are provided as the fuel rods 15. The enrichment and the concentration of gadolinium which is a burnable poison of each of the fuel rods is shown in Table 1. The fuel rods 25 and 26 contain gadolinium, and the fuel rods 21 to 24 contain no gadolinium. The enrichment of the fuel rod 21 is 3.2 wt. %, the enrichment of the fuel rod 22 is 3.8 wt. %, the enrichment of the fuel rods 23, 25 and 26 is 4.4 wt. %, and the enrichment of the fuel rod 24 is 4.8 wt. %.

TABLE 1

| Numeral of fuel rod | 21 | 22 | 23 | 24 | 25 | 26 |
|---|---|---|---|---|---|---|
| Enrichment (wt. %) | 3.2 | 3.8 | 4.4 | 4.8 | 4.4 | 4.4 |
| Gadolinium (wt. %) | — | — | — | — | 4.5 | 3.5 |
| Number | 4 | 8 | 24 | 24 | 12 | 4 |

The average enrichment of the fuel assembly 10 is 4 wt. %, and gadolinium is contained in the fuel rods 25 and 26 in the concentrations of 4.5 wt. % and 3.5 wt. %, respectively.

Figure 5:
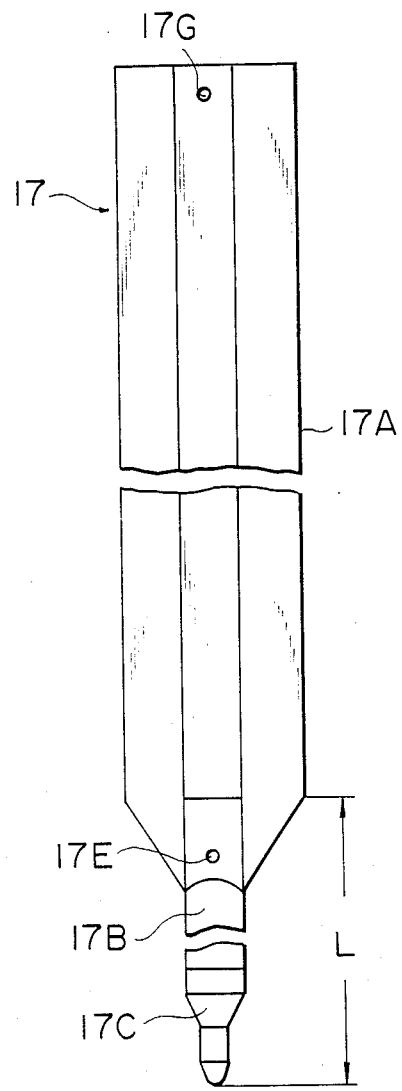
FIG. 5 is a side view of the water rod shown in FIG. 3.
Figure 6:
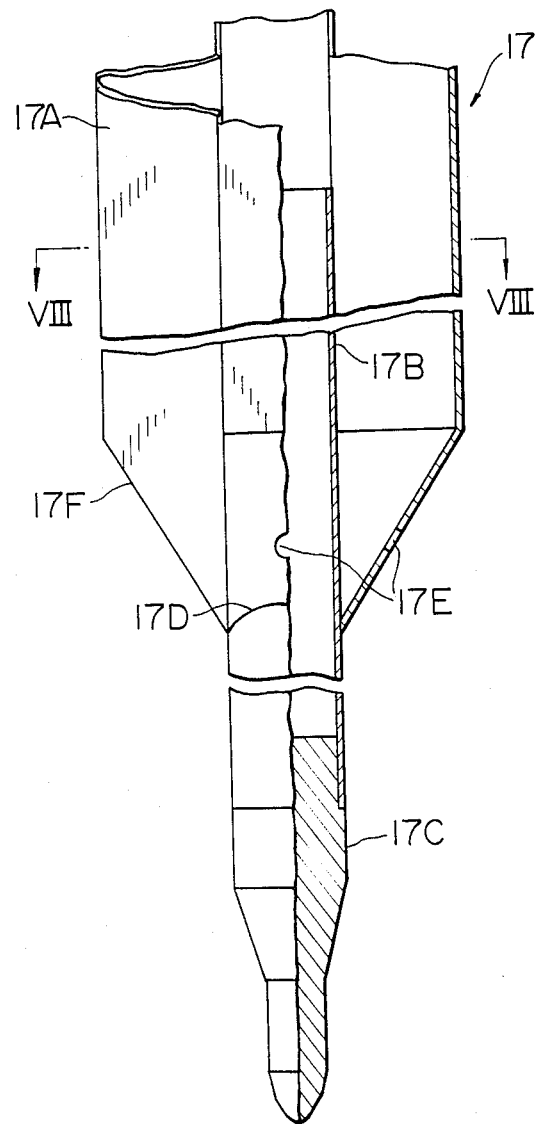
FIG. 6 is an enlarged view of the lower portion of the water rod shown in FIG. 5.
Figure 7:
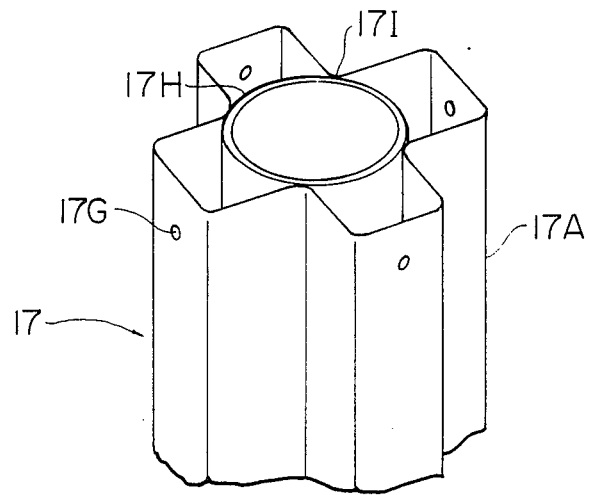
FIG. 7 is an enlarged perspective view of the upper end of the water rod shown in FIG. 5.
Figure 8:
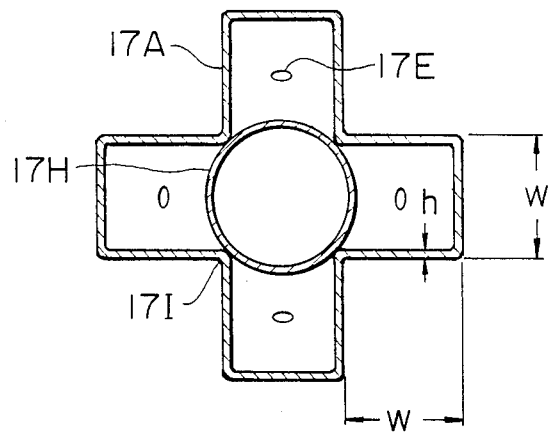
FIG. 8 is a sectional view taken along the line VIII—VIII of FIG. 6.

The fuel assembly 10 has the cross section of a square form. The fuel rods 15 are arranged in the periphery of the fuel assembly 10 in a matrix having 9 rows and 9 columns so as to surround the water rod 17. In other words, the fuel rods 15 are arranged between the sides of the water rod 17 and the sides of the fuel assembly 10 (for example, the sides of the channel box 11). Light water serving as cooling water flows into the spaces between the respective fuel rods 15 in the channel box 11 from the lower tie plate 14, upwardly passes through the spaces between the respective fuel rods 15 and the fuel rods 15 and the water rod 17, and flows out to the outside of the fuel assembly through the upper tie plate 13. As shown in FIG. 5, the water rod 17 has a cross-shaped hollow rod 17A which has a moderator region containing light water (specifically saturated water) serving as a moderator. The moderator region has a the cruciform cross-section. The width of each of projecting portions of the cruciform hollow rod 17A (the distance W between external walls of the hollow rod 17A) is 1.4 cm which is the same as the pitch of the fuel rods 15. The wall thickness of the hollow rod 17A is 0.08 cm. Therefore, the cross-sectional area of the moderator region having a cruciate form in the water rod 17 is 8.48 cm$^2$. Portion S shown in FIG. 4 denotes the shape of a fuel lattice unit. This fuel lattice unit S has a square form having sides which each have the same length as the pitch (1.4 cm) of the fuel rods 15. The fuel assembly 10 of this embodiment comprises 9 fuel lattice units S in the direction shown by J and 9 lattice units S in the direction shown by I, as shown in FIG. 4. The water rod 17 occupies the five fuel lattice units S of (4, 5), (5, 4), (5, 5), (5, 6) and (6, 5) which are each denoted by (I, J). In this embodiment, the ratio of the area $A_M$ of the moderator region in the water rod 17 to the total area $A_U$ of the five fuel lattice units S where the water rod 17 is disposed, but in which no fuel rods 15 are arranged, is 86.5%. The average ratio (H/U) of the number of hydrogen atoms to the number of uranium atoms of the fuel assembly 10 is about 5.0 which is an optimum value for the enrichment of 4 wt. % from the viewpoint of nuclear properties.

In this embodiment, the ratio $A_M/A_C$ of the area $A_M$ of the moderator region in the cross-sectional plane of the fuel assembly 10 in which the moderator region of the water rod 17 is present to the area $A_C$ of the passage for the cooling water in the fuel assembly 10 is 0.09. The area $A_C$ of the passage for the cooling water is the area of the passage for the cooling water in the channel box 11 and contains no area of the moderator region in the water rod 17.

The configuration of the water rod 17 is described in detail below with reference to FIGS. 5 to 8.

The water rod 17 is made of Zircalloy-2 and comprises the hollow rod 17A having a cruciform cross-section and a cylindrical member 17B and a lower end plug 17C which are provided at the lower end of the hollow rod 17A. The upper end of the hollow rod 17A is placed near the upper end of a region charged with fuel pellets for the fuel rods 15, i.e., the fuel effective length. The cylindrical member 17B is inserted into the lower end of the hollow rod 17A and is fixed to a portion 17D of contact with the hollow rod 17A by solding. The lower end plug 17C seals the lower end of the cylindrical member 17B. The lower end plug 17C is provided on the lower tie plate 14 so that the water rod 17 is held in the fuel assembly 10. The cylindrical member 17B is so configured as to reinforce the interior of the hollow rod 17A. Since the cylindrical member 17B functions to increase the strength of the water rod 17 and to absorb neutrons, it is used only in the lower portion of the water rod 17. The lower end of the hollow rod 17A has a surface 17F inclined to the cylindrical member 17B. The provision of the inclined surface 17F causes the area of the passage for the cooling water to gradually change from the lower end of the fuel assembly 10 to the upper end thereof and thus prevents an increase in the pressure loss due to a rapid contraction flow.

Cooling water inlets 17E for introducing the light water sering as the cooling water (also serving as a moderator), which flows into the channel box 11, into the water rod 17, i.e., the hollow rod 17A, are provided in the inclined surface 17F of the hollow rod 17A. Cooling water outlets 17G for discharging the cooling water to the outside of the water rod are provided in the hollow rod 17A. As shown in FIG. 5, cylindrical reinforcing members 17H are provided in the hollow rod 17A in an upper portion of the water rod 17. Each of the reinforcing members 17H has a small axial length (for example, 3 to 4 cm and is provided on the four concave portions 17I of the hollow rod 17A by soldering. The upper end of the hollow rod 17A is sealed (not shown). The reinforcing members 17H are provided at, for example, 3 to 5 positions in the axial direction of the water rod 17 so as to increase the strength of the water rod 17, i.e., so as to prevent the hollow rod 17A from expanding outward.

The water rod 17 effectively acts on a portion in the fuel assembly 10 in which the cooling water in the passage produces bubbles in a saturated state. However, the cooling water is in an unsaturated state at the lower end of the fuel assembly 10, and it is thus not significant that the water rod 17 is present at the lower end thereof. In addition, the water rod 17 having a large cross section tends to reduce the area of the cooling water passage in the fuel assembly 10 and thus to increase the pressure loss, or increase the amount of neutrons absorbed because of an increase in the amount of the structural members required. It is therefore preferable that the cross-section of the water rod 17 is small in a lower portion of the fuel assembly 10. In this embodiment, the cross-section of the cylindrical member 17B is smaller than that of the cruciform of the hollow rod 17A, whereby the pressure loss in a lower portion of the fuel assembly 10 can be reduced.

The region of unsaturated water in a lower portion of the fuel assembly 10 is generally within the range of 30 to 60 cm upward from the lower tie plate 14. In this embodiment, therefore, the length L of the portion of the water rod 17 having a small cross section shown in FIG. 5 is 40 cm.

A description will now be made of the function of the cylindrical member 17B which serves as a reinforming member in the lower portion of the water rod 17.

The maximum relative stress produced when pressure of 10 atm is applied to the hollow rod 17A from the outside thereof is 15.4 kgf/mm$^2$ if the hollow rod 17A is not reinforced by the cylindrical member 17B, and is 2.6 kgf/mm$^2$, which is about 1/6 of the above-described value, if the hollow rod 17A is reinforced by the cylindrical member 17B. The maximum amount of deformation produced when the cylindrical member 17B is present is about 1/30 of that produced if no cylindrical member 17B is present. Since the reinforcing member 17H is also provided, the strength of the water rod 17 is increased. The amount of neutrons absorbed by the reinforcing member 17H can be reduced by making the wall thickness of the reinforcing member 17H smaller than that of the cylindrical member 17B.

A moderating rod comprising a solid moderator such a zirconium hydride or beryllium may be used as a moderating rod in place of the water rod.

Figure 9:
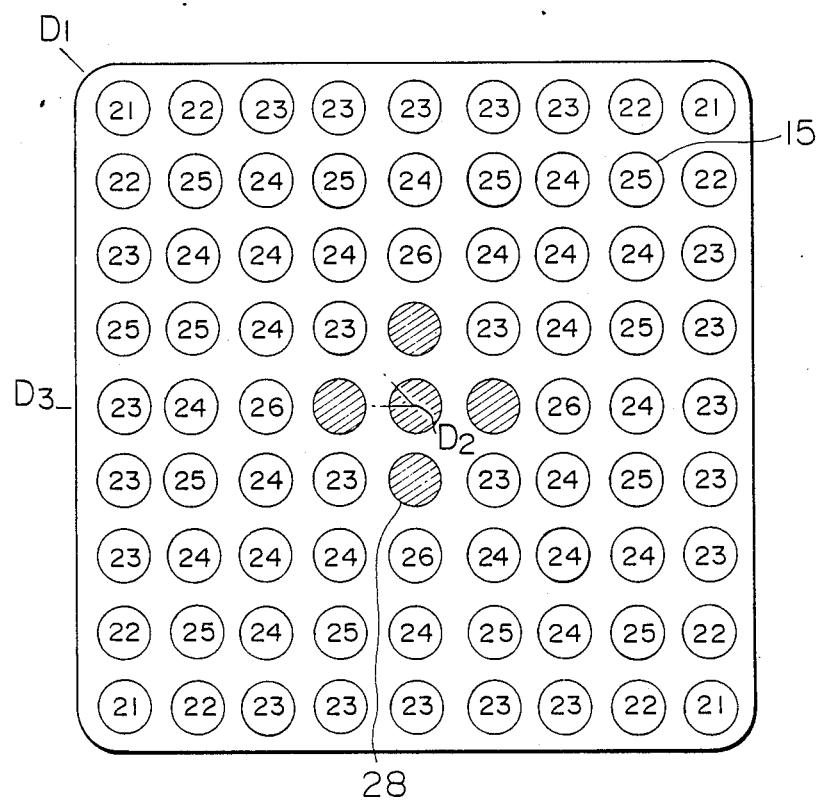
FIG. 9 is a cross-sectional view of a fuel assembly in which a cross-shaped water rod of the fuel assembly shown in FIG. 4 is replaced by five circular water rods.

In order to show the effect of this embodiment, the fuel assembly shown in FIG. 9 is conceived in which the cruciform water rod 17 shown in FIG. 4 is replaced by five water rods 28 each having a circular cross sectional form. The enrichment and the gadolinium distribution of each fuel rod are the same as those employed in the embodiment of the present invention. When the outer diameter of each of the water rods 28 is the same as that of each of the fuel rods 15, the total cross-sectional area of moderator regions in the five water rods is about 4.5 cm$^2$ which is about half that of the embodiment of the present invention.

As a result, the neutron infinite multiplication factor of the fuel assembly 10 of the embodiment of the present invention is about 0.4% $\Delta k_\infty$ greater than that of the fuel assembly shown in FIG. 9, with the amount of necessary natural uranium being reduced by about 2%.

Figure 10A:
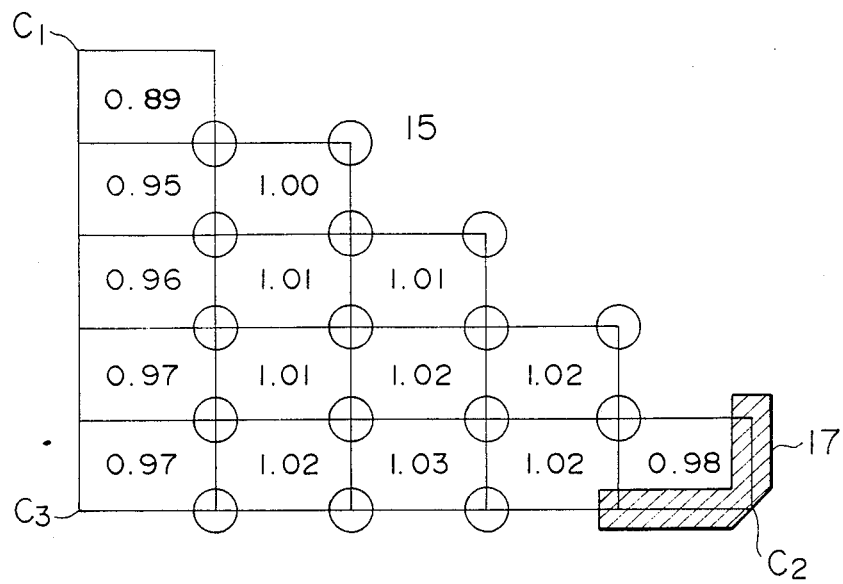
FIG. 10 is an explanatory view which shows the flow distribution of cooling water in the cross-sectional plane of the fuel assembly shown in FIG. 4, and 10B is an explanatory view which shows the flow distribution of cooling water in the cross-sectional plane of the fuel assembly shown in FIG. 9.
Figure 10B:
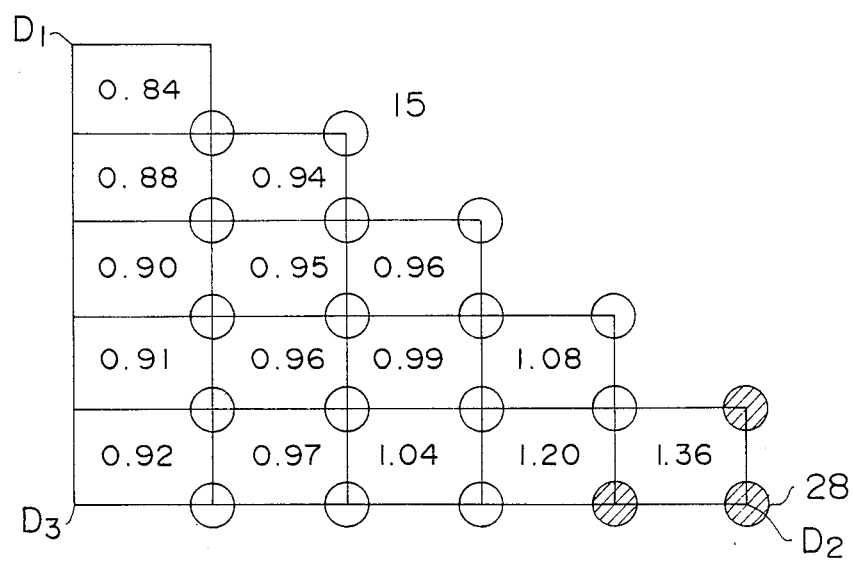

The critical power ratio, which indicates thermal allowance relative to boiling transition, of the fuel assembly 10 of the embodiment of the present invention is 4.3% greater than that of the fuel assembly shown in FIG. 9. FIG. 10A shows the distribution of the flows of the cooling water in the region surrounded by positions $C_1$ $C_2$ and $C_3$ of the embodiment of the present invention (FIG. 4), and FIG. 10B shows the distribution of the flows of the cooling water in the region surrounded by positions $D_1$, $D_2$ of the fuel assembly shown in FIG. 9 (the numerical values are normalized so that the average value of each of the fuel assemblies is 1.0). The distribution of the cooling water flows in the embodiment of the present invention is even, as shown in FIG. 10A, while in the assembly shown in FIG. 9 using the water rods 18 having a circular cross-sectional form, the flows of the cooling water around the water rods 18 are large and the flows near the position $D_1$ close to the channel box are as small as 84% of the average value. Therefore, boiling transition easily takes place in the fuel rods positioned around the water rods 18. In the fuel assembly shown in FIG. 2 of Japanese Patent Laid-Open No. 178387/1984 (not shown in the drawings), the flows of cooling water around a water rod having a square cross-sectional form placed at the center are large and the flows near a channel box are small, in the same way as in the fuel assembly shown in FIG. 9. However, the degree of the drift of the cooling water flows in the fuel assembly disclosed in Japanese Patent Laid-Open No. 178387/1984 is smaller than that in the fuel assembly shown in FIG. 9, but is larger than that in the fuel assembly 10 of the embodiment the present invention.

Since the embodiment of the present invention exhibits a remarkable effect in terms of savings of the uranium consumption and the improved fuel economy and shows an even distribution of the cooling water flows in the fuel assembly, the critical power ratio of the fuel assembly is increased, and the degree of thermal allowance thereof is improved. The embodiment of the present invention shows a greater effect in terms of saving the uranium consumption and a greater critical power ratio than those of the fuel assembly shown in FIG. 2 of Japanese Patent Laid-Open No. 178387/1984.

A description will now be made of the characteristic function obtained when the outer sides of the water rod and the cross section of the moderator region therein both have a cross shape, as in the embodiment of the present invention.

Figure 11:
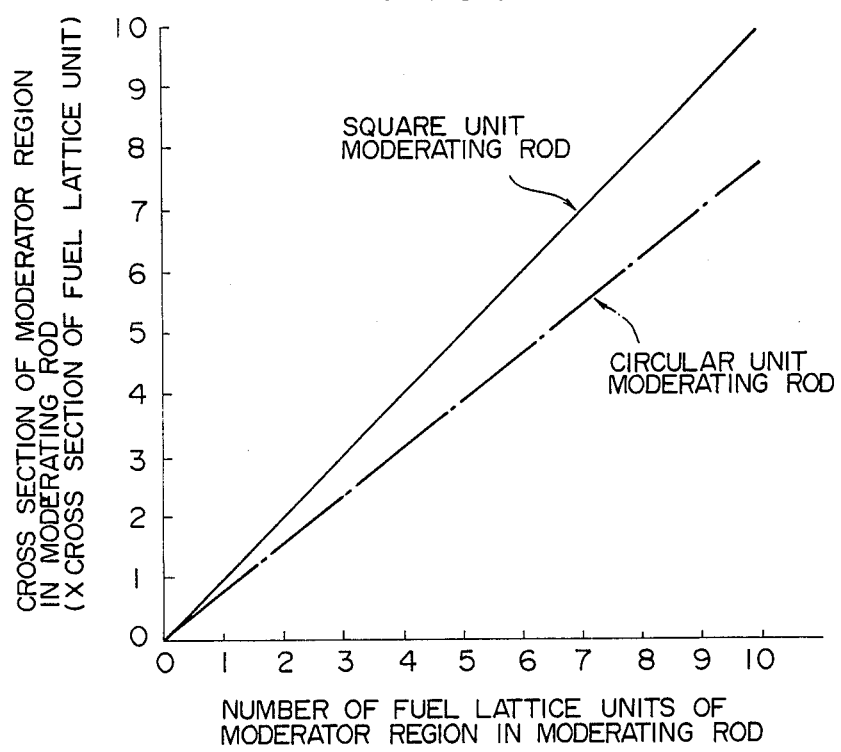
FIG. 11 is a diagram of characteristics showing the relationship between the number of fuel lattice units in a moderator region in a moderating rod and the cross-section of such a moderator region.

FIG. 11 shows a comparison of the relationship between the number of fuel lattice units contained in the moderator region in the moderating rod and the cross-sectional area of he moderator region in the case of a moderating rod comprising circular units with those in the case of a moderating rod comprising square units. As seen from FIG. 11, the cross section of the moderator region in the moderating rod comprising square units can be made about 30% larger than that in the moderating rod comprising circular units. In other words, in order to obtain an optimum cross-sectional area of the moderator region, the number of the fuel rods required to be removed for providing the moderating rod comprising circular units is 1.4 time that for providing the moderating rod comprising square units. Therefore, when fuel rods comprising circular units are used, the linear power density of each fuel rod is increased, or the amount of fuel materials loaded is reduced, resulting in a loss of the fuel economy. In addition, when the moderating rod comprises circular units, a large coolant passage is formed between the moderating rod and each of the fuel rods, and a large amount of coolant having a small effect of removing heat flows through the passage, resulting in a reduction in the minimum critical power ratio by about 2%.

Figure 12:
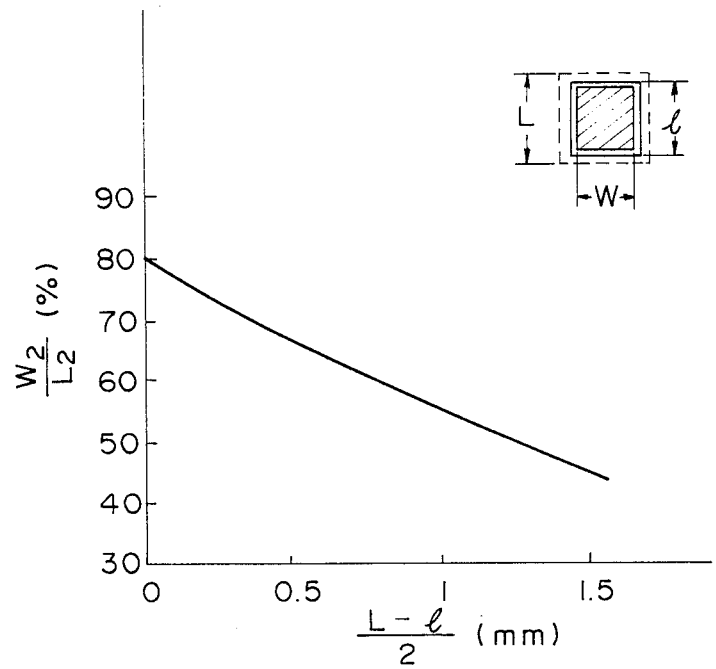
FIG. 12 is a diagram of characteristics showing a range of the cross-section of a moderator region in a water rod.

FIG. 12 shows the relationship between the length 1 of one side of a square unit, the cross-sectional area $\omega^2$ of the moderator region, and the cross-sectional area $L^2$ of the fuel lattice unit S, in the moderating rod comprising square units. In this case, the wall thickness of a covering tube for the moderating rod is 0.76 mm. When the moderator region comprises a plurality of moderators, the size of the moderating rod is limited from the viewpoint of insertion of the moderating rod, and thus rate of the cross section of the covering tube is increased. The present minimum value of $(L-1)/2$ shown in FIG. 12 is about 0.5, and the cross-sectional area of the moderator region which can be secured by the moderating rod cannot be made 75% or more the cross-sectional area of the fuel lattice unit S. On the other hand, when one large moderating rod is used, as the embodiment shown in FIG. 4, since there is no region of the cooling water which does not attribute to the cooling of fuel and which is present between moderating rods, the cross-sectional area of the moderating rod can be made 75% or more of the total area of the fuel lattice units in which the fuel rods removed for providing a moderating rod are placed. Consequently, in order to attain an optimum cross-sectional area of the moderator region for the fuel assembly comprising fuel rods which are arranged in a lattice form having 9 rows and 9 columns and comprising the fuel lattice units S that each have the length L of one side of 1.4 cm, fuel rods may be removed from five fuel lattice units S in the embodiment shown in FIG. 4, while fuel rods must be removed from 6 to 7 fuel lattice units in the case comprising a plurality of moderating rods. In addition, in the fuel assembly 10, since there is no coolant which exhibits a small effect of cooling and flows through gaps between moderating rods, no problem with respect to an decrease in the critical power ratio occurs, as described above.

Figure 13:
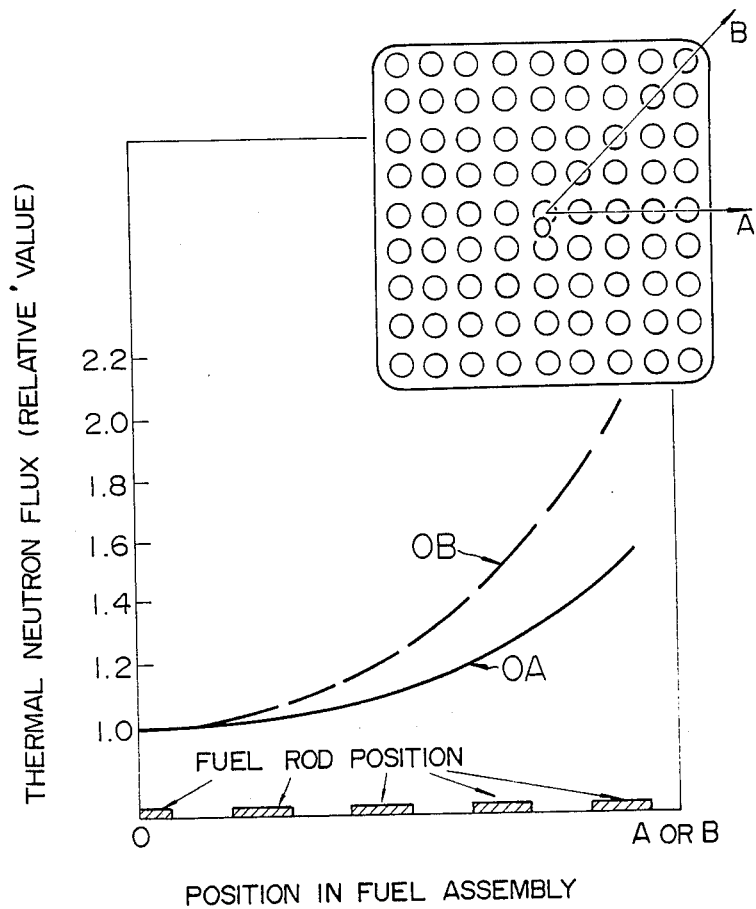
FIG. 13 is a diagram of characteristics showing the distributions of the thermal neutron fluxes in the diagonal direction of a fuel assembly and the direction vertical to a channel box.

FIG. 13 shows the distribution of the thermal neutron fluxes in the fuel assembly. At position at which thermal neutron fluxes are small, the effect of moderating neutrons is poor and reactivity is low. A comparison of a curve OA (in the direction OA of the fuel assembly shown in an upper right portion in the same figure) with a curve OB (in the direction OB of the fuel assembly shown in an upper right portion in the same figure) shows that the thermal neutron fluxes in the direction OA are smaller than those in the direction OB. This is because the fuel rods in the direction OB are affected by gap water regions in two directions. Therefore, the cross shape of the water rod 17 is preferably arranged so as to be at right angles with respect to the sides of the fuel assembly 10, i.e. the sides of the channel box 11.

Figures 14, 15:
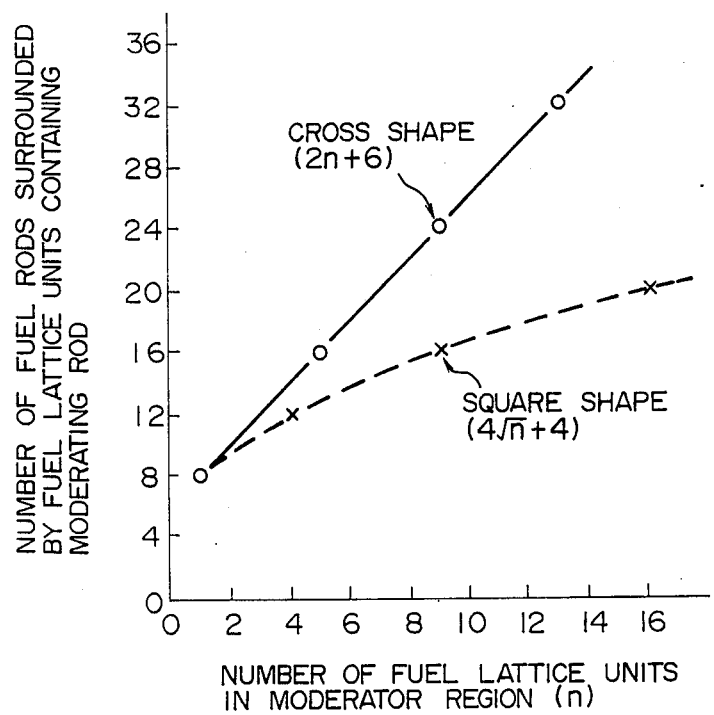
FIG. 14 is a diagram of characteristics showing the relationship between the number of fuel lattice units where a moderator region is disposed, but where no fuel rods are arranged the number of fuel rods surrounded by fuel lattice units containing a moderator rod.
FIG. 15 is an explanatory view which shows the distribution of power peaking in the cross-section plane of a fuel assembly which has a cross-shaped water rod and fuel rods arranged in a matrix having 9 rows and 9 columns.

FIG. 14 shows a comparison of the relationship between the number of the fuel lattice units in the moderator region and the number of the fuel rods, which surround the moderating rod and are adjacent thereto, with respect to the cross-sectional shapes of the moderating rods. In the cross-shaped water rod 17 of the embodiment shown in FIG. 4, all the fuel lattice units S which are contained in the moderator region and in which no fuel rods 15 are arranged are always adjacent to the fuel rods 15 surrounding the water rod 17. Therefore, the number of the fuel rods surrounding the water rod is increased, as compared with the case in which the entire cross sectional form of the moderating rod is a square. As a result, the affects described below can be obtained.

(i) The rate of utilization of neutrons is increased, and the fuel economy is improved, and (ii) lattice positions adjacent to the water rod 17 can be employed as positions at which fuel rods containing gadolinium as a burnable position are arranged.

FIG. 15 shows the coefficients of local power peaking in the assembly 10 provided with the water rod 17 in which the cross section of the moderator region has a cruciate form (fuel rods have the same enrichment and contain no gadolinium). Each of the squares shown in FIG. 5 corresponds to one fuel rod. The fuel rod (denoted by K in FIG. 15) which is adjacent to the water rod 17 and faces two sides surfaces thereof and the outermost fuel rods (denoted by J in FIG. 15) which are adjacent to water gaps (i.e., the channel box) provided around the fuel assembly in a reactor core exhibit higher levels of power peaking. The other fuel rods show lower levels of power peaking than those of the above-described fuel rods. By setting the degree of enrichment of the fuel rods excluding the fuel rods containing gadolinium so as to be in the order of the fuel rods J< the fuel rod K< the other fuel rods for the purpose of increasing the thermal allowance of this fuel assembly, the power distribution in the cross-sectional plane of the fuel assembly can be made even. That is, if the average enrichment of the fuel rods of said fuel rods (15) arranged in the periphery of said fuel assembly is $E_A$, the average enrichment of the fuel rods which are adjacent to said moderating rod (17) and each face the two sides thereof is $E_B$, and average the enrichment of the other fuel rods (25) is $E_C$, the inequality $E_A < E_B < E_C$ is established.

Figure 16:
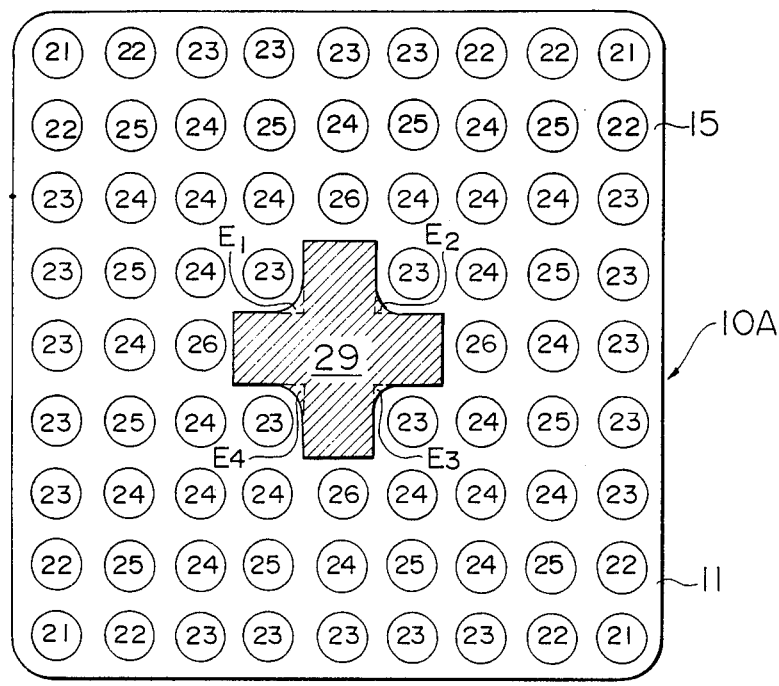
FIGS. 16 and 22 are cross-sectional views of fuel assemblies of other embodiments of the present invention.

FIG. 16 shows another embodiment of the fuel assembly of the present invention. A fuel assembly 10A of this embodiment has the same structure as that of the above-described fuel assembly 10 with the exception that the shape of a water rod 29 is different therefrom. In the fuel assembly 10A, the water rod 29 is arranged at the center thereof in the same was as in the fuel assembly 10. The water rod 29 also has a cruciate cross-sectional form, but is different from the water rod 17 with respect to the portions in the water rod 29 which correspond to the concave portions 17I of the hollow rod 17A in the water rod 17 and which are projected toward the fuel rods adjacent to these portions so that the distance between each of the fuel rods and the sides of each of the concave portions is constant. Such a configuration increases the cross-sectional area of a moderator region in the water rod 29 by about 0.5 cm$_2$ as compared with that in the water rod 17. Therefore, the effect of saving the uranium consumption of the fuel assembly 10A is greater than that of the fuel assembly 10. In this embodiment, the number of the fuel lattice units S in which the water rod 29 is disposed, but in which no fuel rods are arranged, is the same as that in the fuel assembly 10.

In addition, since there is no useless passages of cooling water which are shown by $E_1$ to $E_4$ in FIG. 16 and produced around the water rod 29, the thermal allowance for boiling transition is 0.4% greater than that of the fuel assembly 10.

The water rod 29 comprises a hollow rod 29A which has a cruciate cross-sectional form and rounded concave portions 29F, as shown in FIGS. 17 and 18. A prismatic member 29B having a square cross-sectional shape is passed through the hollow rod 29A. The lower end of the prismatic member 29B is provided with an end plug 29C which is provided on a lower tie plate 14. The lower end of the hollow rod 29A has an inclined surface 29E in the same was as the water rod 17, the inclined surface 29E having a plurality of inlets 29D of cooling water.

The use of the prismatic member 29B in place of the cylindrical member 17B has an advantage in that the amount of the constituent members thereof can be reduced as compared with the cylindrical member 17B because points 29I of constant between the prismatic member 29B and the hollow rod 29A are connected by the shortest lines, whereby the absorption of neutrons can be reduced.

Figure 19:
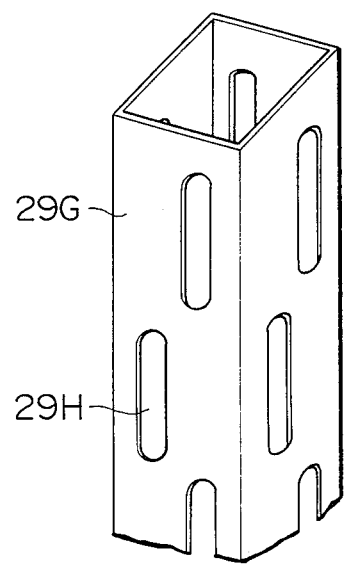
FIG. 19 is a perspective view of another embodiment of the prismatic member shown in FIG. 18.

FIG. 19 shows another embodiment of the prismatic member 29B used in the water rod 29. A prismatic member 29G of this embodiment has a plurality of holes 29H in a number within a range which will not remarkably reduce its structural strength. The provision of the holes 29H reduces the amount of a constituent of the prismatic member so as to reduce the amount of neutrons absorbed. Such a structure is not specific only to the prismatic member 29B, but can also be applied to the cylindrical member 17B.

Figure 20:
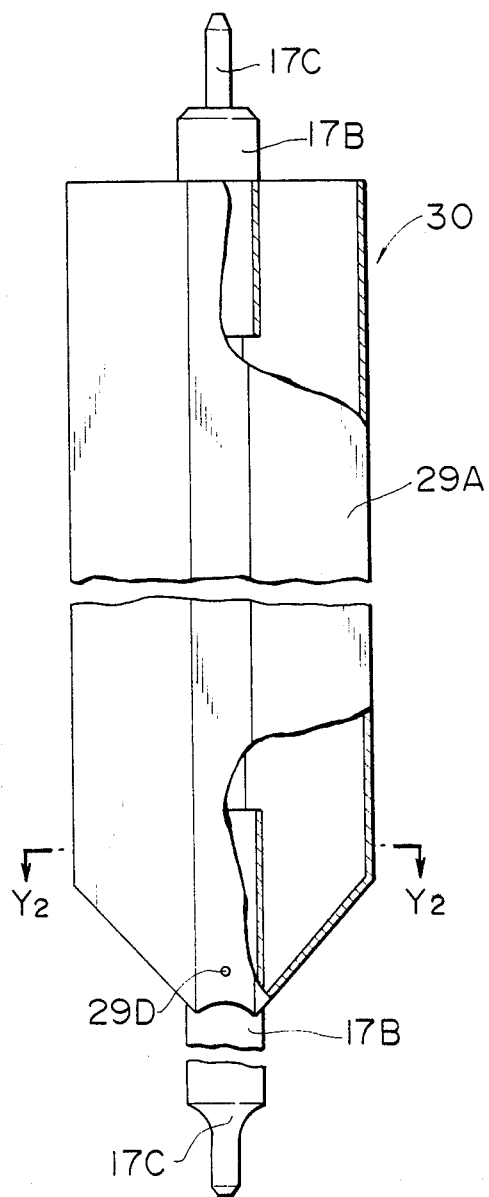
Figure 21:
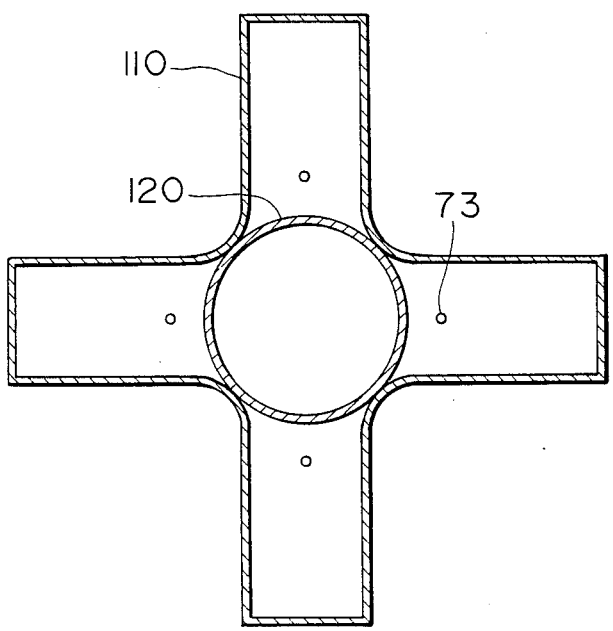
FIG. 21 is a sectional view taken along the line $Y_2$—$Y_2$ of FIG. 20.

FIGS. 20 and 21 show another embodiment of the water rod used in the fuel assembly 10 or 10A. A water rod 30 of this embodiment comprises a cylindrical member 17B having end plugs 17C which are respectively provided on an upper tie plate 13 and lower tie plate 14. This embodiment is different from the water rod 29 in the point that the cylindrical member 17B is not passed through a portions. Such a structure has the effects in terms of a reduction in the amount of the structural member at the center of the water rod 30 in the axial direction thereof, and thus a reduction in the amount of neutrons absorbed. Such a structure can also reduce a pressure loss at the upper and lower ends of the fuel assembly.

The above-described embodiments concern the water rods serving as neutron moderating rods which was unsaturated water, but they can be applied to a neutron moderating rod using a solid moderator. A reinforcer can be provided in a region between support members 120, 121, as occasion demands.

Figure 22:
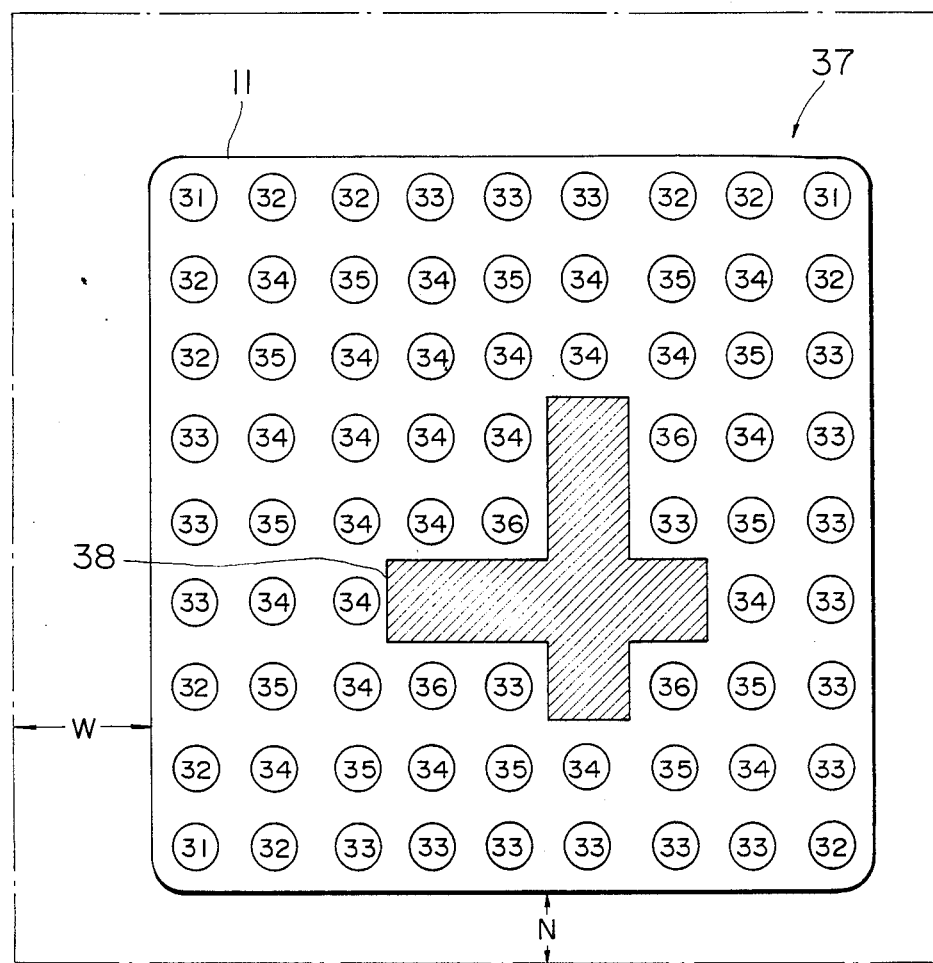

A further embodiment of the fuel assembly which is applied to a boiling water reactor is described below with reference to FIG. 22.

A fuel assembly 37 of this embodiment is applied to the case in which the thicknesses of gap regions are not constant around a channel box 11. Fuel rods 31 to 36 used in the fuel assembly 37 of this embodiment have the enrichment shown in Table 2. The fuel rods 35 and 36 contain gadolinium. Reference numeral 38 denotes a cross-shaped water rod. The axis of the water rod 38 is located at a position shifted to the side of a shinner gap region (shown by N in FIG. 22). The cruciate shape of the water rod 38 has a shorter length on the side N and a longer length on a side W. Consequently, the distribution of neutron fluxes can be effectively made even, and the fuel economy and thermal allowance can be improved as compared with conventional fuel assemblies.

TABLE 2

| Numeral of fuel rod | 31 | 32 | 33 | 34 | 35 | 36 |
|---|---|---|---|---|---|---|
| Enrichment (wt. %) | 3.0 | 3.6 | 4.4 | 4.8 | 4.4 | 4.4 |
| Gadolinium (wt. %) | — | — | — | — | 4.5 | 3.5 |
| Number | 3 | 11 | 20 | 24 | 12 | 4 |

This invention is capable of improving the fuel economy by an increase in the effect of saving uranium, and increasing the thermal allowance by an increase in the critical power ratio of a fuel assembly.

What is claimed is:

1. A fuel assembly comprising a plurality of fuel rods and a moderating rod containing a moderator and disposed at a generally central portion, of said fuel assembly, the ratio $A_M/A_C$ of the area $A_M$ of a moderator region in said moderating rod in the cross-sectional plane in which said moderator is present to the area $A_C$ of the coolant passages in said fuel assembly being within the range of 0.07 to 0.11, and said area $A_M$ being 75% or more of the total area of the fuel lattice units in which none of said fuel rods is arranged, but said moderating rod is arranged.

2. A fuel assembly according to claim 1, wherein if the average enrichment of the fuel rods of said fuel rods arranged in the periphery of said fuel assembly is $E_A$, the average enrichment of the fuel rods which are adjacent to said moderating rod and each face the two sides thereof is $E_B$, and average the enrichment of the other fuel rods is $E_C$, the inequality $E_A < E_B < E_C$ is established.

3. A fuel assembly comprising a moderating rod containing a moderator and a plurality of fuel rods which are arranged around said moderating rod, said plurality of fuel rods being arranged in a lattice form having 9 rows and 9 columns so as to surround said moderating rod, the ratio $A_M/A_C$ of the area $A_M$ of a moderator region in said moderating rod in the cross-sectional plane in which said moderator is present to the area $A_C$ of the coolant passages in said fuel assembly being within the range of 0.07 to 0.11, and said area $A_M$ being 75% or more of the total area of the fuel lattice units in which none of said fuel rods is arranged, but said moderating rod is arranged.

4. A fuel assembly according to claim 3, wherein if the average enrichment of the fuel rods of said fuel rods arranged in the periphery of said fuel assembly is $E_A$, the average enrichment of the fuel rods which are adjacent to said moderating rod and each face the two sides thereof is $E_B$, and average the enrichment of the other fuel rods is $E_C$, the inequality $E_A < E_B < E_C$ is established.

5. A fuel assembly comprising a moderating rod containing a moderator and having a cruciate cross-sectional form of a region in which said moderator is present, and a plurality of fuel rods arranged around said moderating rod so as to surround it, said fuel rods being arranged between the sides of said moderating rod and sides of the said fuel assembly, the ratio $A_M/A_C$ of the area $A_M$ of a moderator region in said moderating rod in the cross-sectional plane in which said moderator is present to the area $A_C$ of the coolant passages in said fuel assembly being within the range of 0.07 to 0.11, and said area $A_M$ being 75% or more of the total area of the fuel lattice units in which none of said fuel rods is arranged, but said moderating rod is arranged.

6. A fuel assembly according to claim 5, wherein the projecting portions of a cruciate form of said moderating rod are placed at right angles with respect to the sides of said fuel assembly.

7. A fuel assembly according to claim 5, wherein if the average enrichment of the fuel rods of said fuel rods arranged in the periphery of said fuel assembly is $E_A$, the average enrichment of the fuel rods which are adjacent to said moderating rod and each face the two sides thereof is $E_B$, and average the enrichment of the other fuel rods is $E_C$, the inequality $E_A < E_B < E_C$ is established.

8. A fuel assembly according to claim 7, wherein the projecting portions of a cruciate form of said moderating rod are placed at right angles with respect to the sides of said fuel assembly.

9. A fuel assembly according to claim 5, wherein said moderating rod has a passage through which a coolant serving as a moderator for a reactor, a means which is provided at the lower end of said moderating rod and introduces said coolant into said passage from the outside thereof, and a means which is provided at the upper end thereof and discharges said coolant from said passage to the outside.

10. A fuel assembly according to claim 5, wherein said moderating rod has a cylindrical body which is sealed at the upper and lower ends thereof and has a cruciate cross-sectional form, a lower end plug which is engaged with said lower tie plate at the lower end of said mode-rating rod, and a cylindrical member which is provided in said cylindrical body in a state wherein part of said cylindrical member is inserted into the center of said cylindrical body.

11. A fuel assembly according to claim 5, wherein said moderating rod has a shape at its lower portion in which the cross-sectional area thereof upwardly and gradually increases.

* * * * *